May 29, 1934.  D. NACHTIGAL  1,961,009
COMBINED POTATO GRADER AND CUTTER
Filed July 25, 1932  4 Sheets-Sheet 1
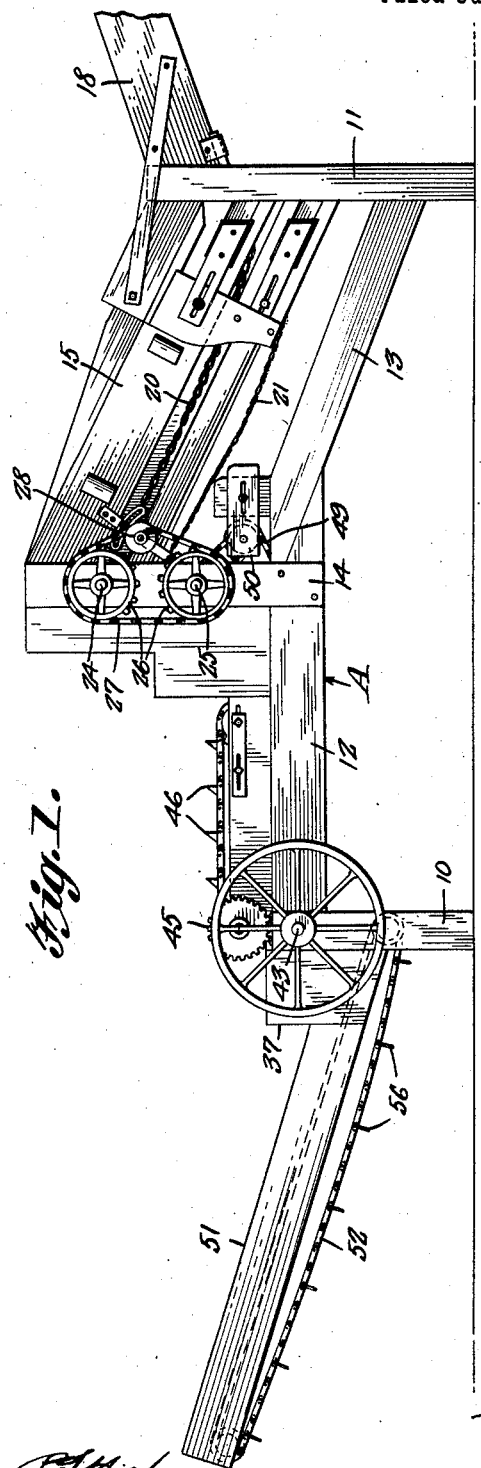
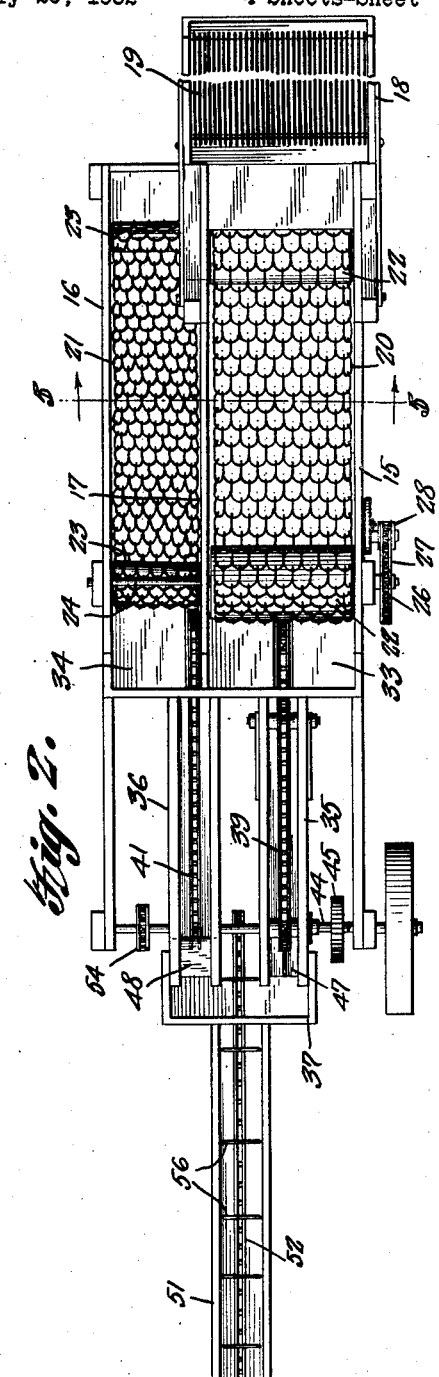
Daniel Nachtigal, INVENTOR May 29, 1934.  D. NACHTIGAL  1,961,009
COMBINED POTATO GRADER AND CUTTER
Filed July 25, 1932  4 Sheets-Sheet 2
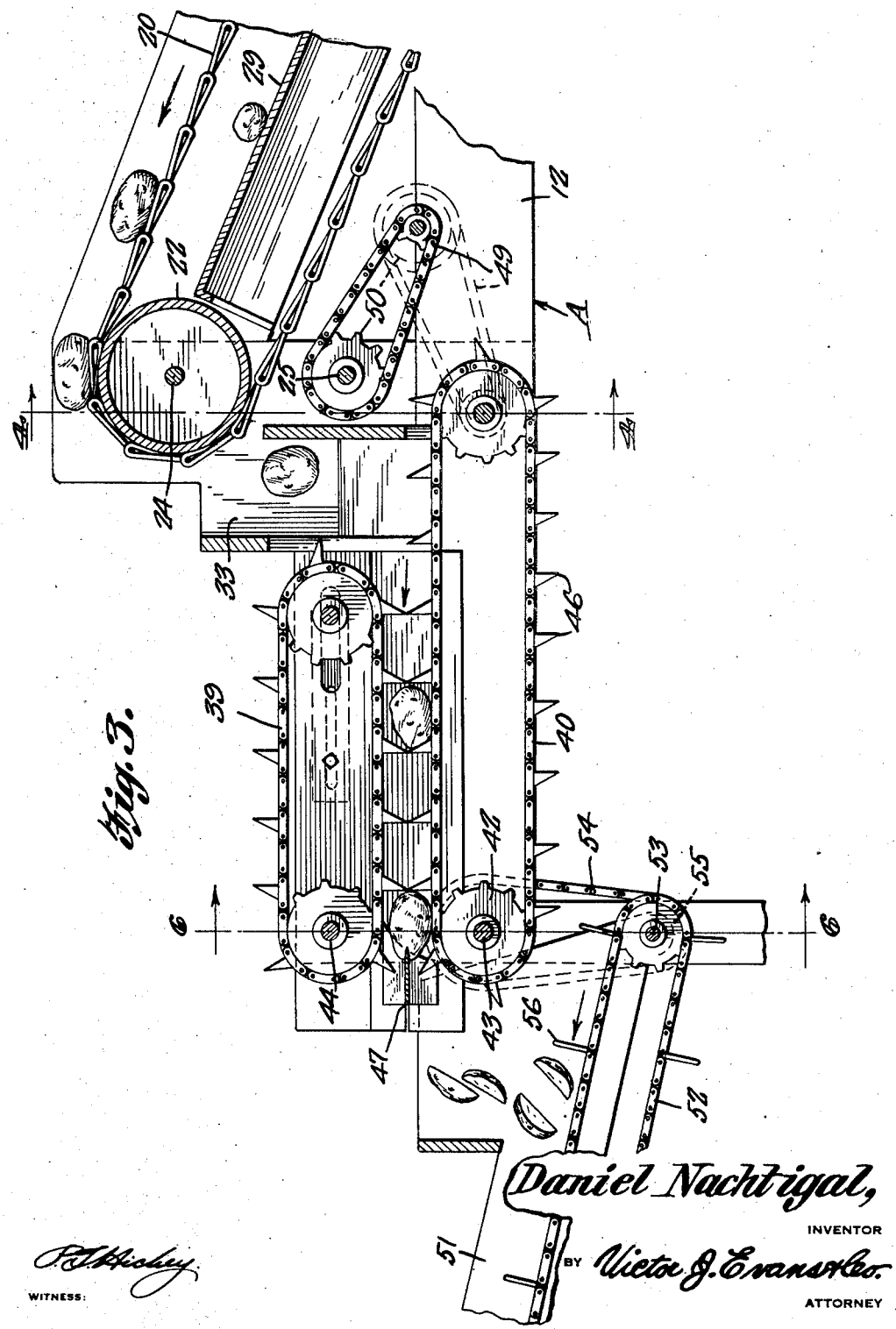

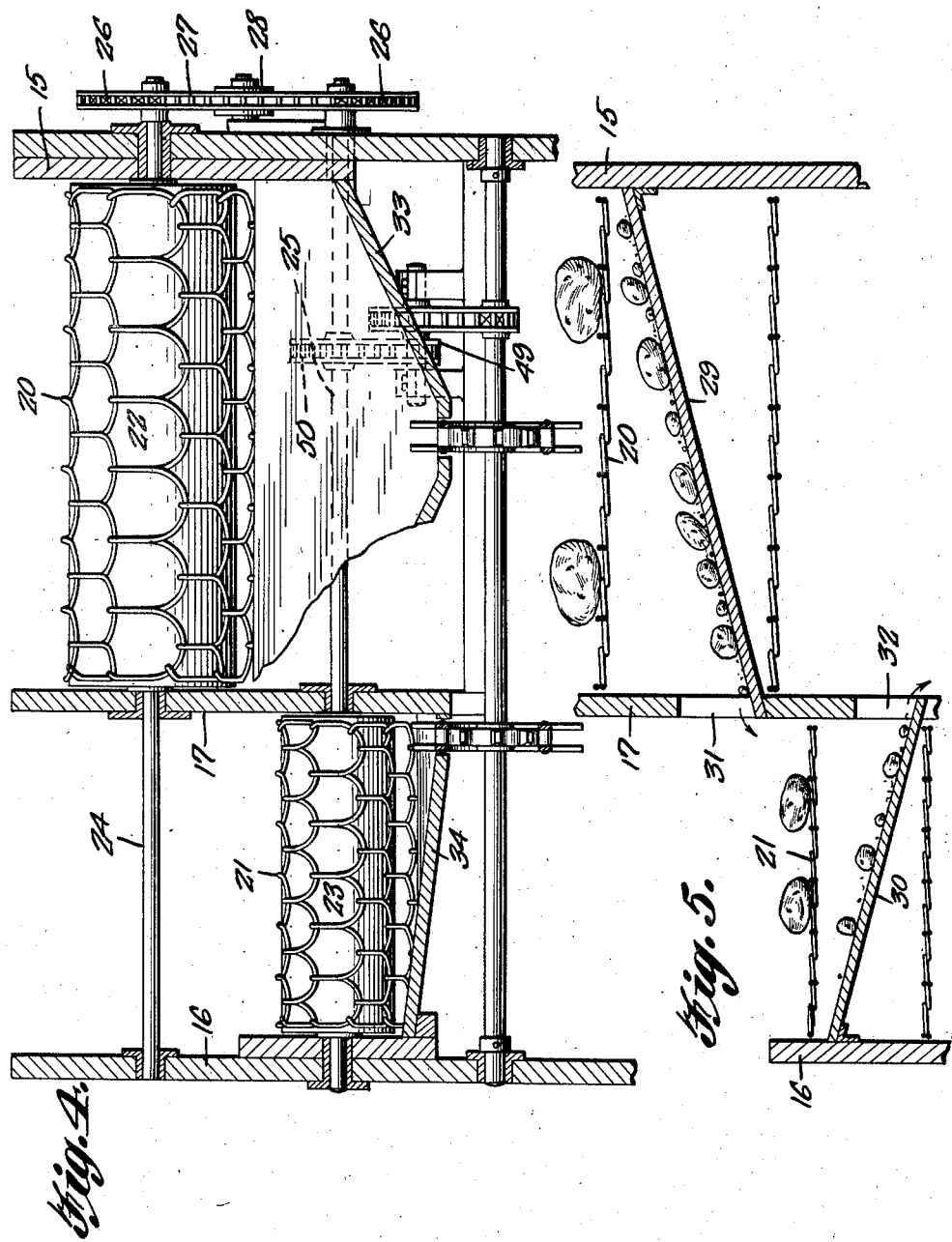

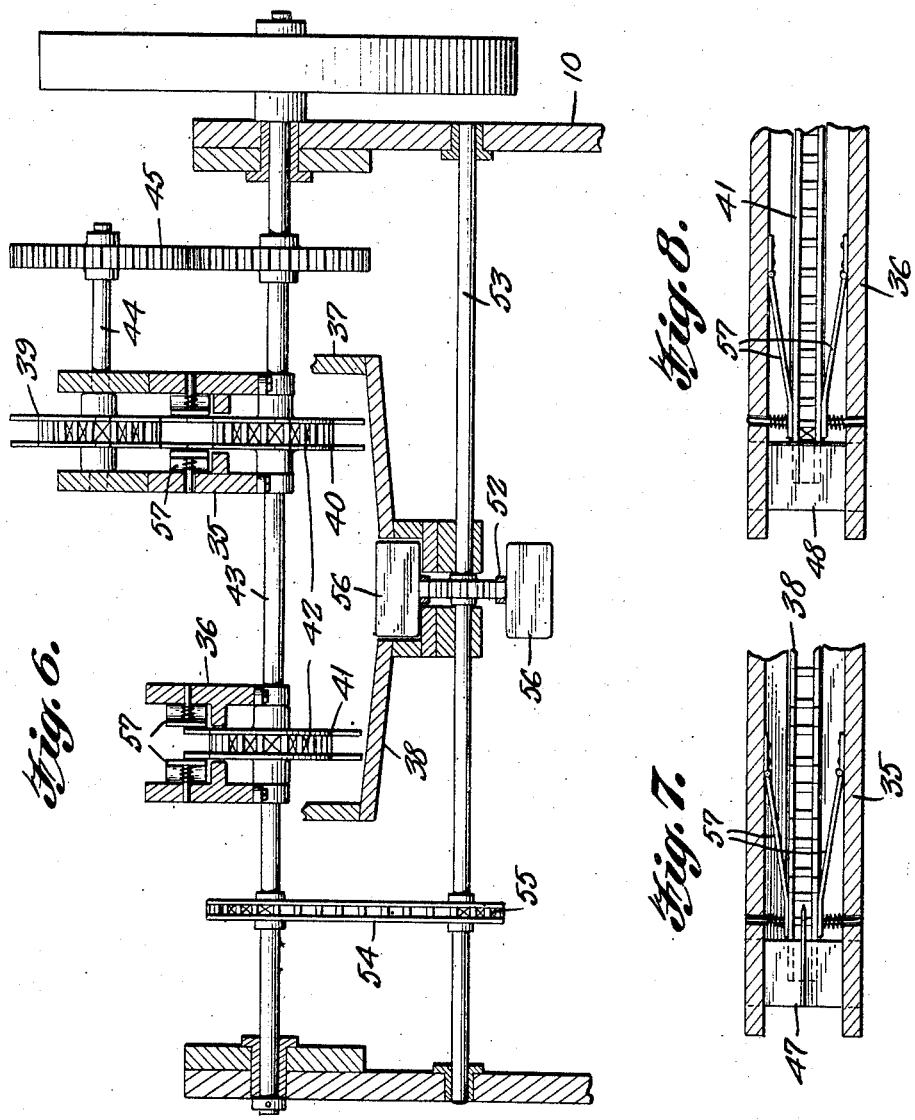

Patented May 29, 1934

1,961,009

UNITED STATES PATENT OFFICE 1,961,009

COMBINED POTATO GRADER AND CUTTER

Daniel Nachtigal, Austin, Minn.

Application July 25, 1932, Serial No. 624,552

1 Claim. (Cl. 146—163)

The invention relates to a grading machine and more especially to a combined potato grader and cutter.

The primary object of the invention is the provision of a machine of this character, wherein potatoes when fed thereto will be graded according to the sizes thereof and the larger potatoes will be cut into quarters while the other sized potatoes will be cut into halves and these automatically delivered from the machine during the operation thereof.

Another object of the invention is the provision of a machine of this character, wherein the grading mechanisms are of novel form and disposed in the machine in a unique manner so that potatoes fed thereto will be automatically graded while the smaller potatoes will be released and the graded potatoes cut on delivery thereof from the machine.

A further object of the invention is the provision of a machine of this character, wherein the construction thereof in its entirety is of novel form and will automatically operate to grade potatoes and sever or cut the same into determined sized pieces.

A still further object of the invention is the provision of a machine of this character which is comparatively simple in construction, thoroughly reliable and efficient in its operation, automatic in action, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings:

Figure 1 is a side elevation of a machine constructed in accordance with the invention.

Figure 2 is a top plan view thereof.

Figure 3 is a fragmentary vertical longitudinal sectional view on an enlarged scale.

Figure 4 is a vertical transverse sectional view on the line 4—4 of Figure 3 looking in the direction of the arrows.

Figure 5 is a sectional view on the line 5—5 of Figure 2 looking in the direction of the arrows.

Figure 6 is a sectional view on the line 6—6 of Figure 3.

Figure 7 is a fragmentary horizontal sectional view through the cutting throat showing the cutters therein for the severing of potatoes into quarters.

Figure 8 is a similar view to Figure 7 showing the cutters for severing the potatoes into halves.

Similar reference characters indicate corresponding parts throughout the several views in the drawings.

Referring to the drawings in detail, A designates generally a stand of the machine and includes the legs 10 and 11 respectively, these supporting the horizontal sill sections 12 and the rearwardly inclined sill sections 13 disposed at opposite sides of the stand, while rising from the horizontal sill sections 12 next to the sections 13 are uprights 14, these together with the legs 11 supporting rearwardly inclined grading frames 15 and 16 respectively which are separated from each other through an intermediate longitudinally directed partition or wall 17.

Communicative with the grading frame 15 at its rearmost end is a forwardly inclined feed or supply chute 18 having a screening bottom 19 and this chute 18 is adapted to deliver or feed potatoes by gravitation or otherwise into the frame 15 for the grading operation of the machine.

Located in the frames 15 and 16 and arranged side by side is an elevated wire mesh or wire linked grading belt or apron 20 and a lower wire mesh or wire linked grading belt or apron 21 respectively, the belt or apron 20 within the frame 15 being higher or elevated with respect to the belt or apron 21 in the frame 16 and this belt or apron 20 is of larger mesh than the mesh of the belt or apron 21 so that medium sized potatoes distinguishable from large potatoes will gravitate therefrom while the large potatoes will be supported thereon for the conveying of the same through the machine and likewise the belt or apron 21 will support the medium sized potatoes while the smaller ones will gravitate therethrough. Journaled transversely in the frames 15 and 16 are suitable carrying cylinders or rollers 22 and 23 respectively for the belts or aprons 20 and 21, these being endless and are trained over said rollers. The roller 22 is supported by a power shaft or axle 24 and likewise the roller 23 is supported by a power shaft 25, these shafts being journaled transversely in the uprights 14 and are simultaneously driven through the medium of sprocket gears 26 and sprocket chain 27 respectively, the chain being trained around the gears 26 and is acted upon by a chain tightener 28 mounted upon one of the uprights 14.

Arranged between the upper and lower stretches of the belts or aprons 20 and 21 are inclines 29 and 30 respectively, these being reversely disposed and superposed relative to each other, the incline 29 at its lowermost portion leading to a slot or opening 31 in the partition or wall 17 above the upper stretch of the belt or apron 21 so that potatoes graded by the belt or apron 20 will be caused to gravitate upon the incline 29 and through the opening 31 onto the belt or apron 21, while the incline 30 leads to an opening 32 in said partition or wall 17 whereby the smaller potatoes graded by the belt or apron 21 will gravitate upon this incline through the opening 32 for discharge from the machine.

Arranged with the uprights 14 and projected forwardly of the frames 15 and 16 are hoppers 33 and 34 respectively, the latter being common to the frame 16 while the hopper 33 is common to the frame 15 and the potatoes retained by the belts or aprons 20 and 21 will be delivered into said hoppers for a purpose presently described.

Opening into the hoppers 33 and 34 and disposed longitudinally and forwardly of the stand A are lead throats 35 and 36, these being in parallel relation to each other and have their foward ends overhanging a discharge trough 37, the same being common to both throats 35 and 36 and formed with a hopper-shaped bottom 38. Within the throat 35 are upper and lower endless conveyor chains 39 and 40 respectively, these being in vertical alignment, while within the throat 36 is the endless conveyor chain 41, the latter with the lower chain 40 being driven through the instrumentality of chain sprockets 42 carried upon a driving shaft 43, the latter being suitably journaled transversely in the stand A while the upper chain 39 is driven through a stud shaft 44 suitably journaled and operated through the gears 45 from the driving shaft 43. The chains 39, 40 and 41 have thereon spaced abutments 46 for potatoes when delivered thereonto from the hoppers 33 and 34 respectively.

Arranged in the discharge end of the throat 35 is a longitudinally centered double bladed or crossed cutting knife 47, the same being stationarily mounted and is in the path of the whole potatoes as fed between the upper and lower chains 39 and 40 so that as the potatoes advance in this throat 35 the same will become severed into quarters immediately preceding the discharge of the cut potatoes into the trough 37. Within the throat 36 at its discharge end is a single bladed cutter or knife 48 which functions to sever the potatoes fed by the chain 41 in said throat 36 into halves immediately preceding the discharge of the potatoes from the throat into the trough 37, the potatoes fed in the throat 36 being medium sized or smaller than the potatoes fed in the throat 35 which are the larger potatoes.

The chains 40 and 41 extend through the lower portions of the hoppers 33 and 34 so that the graded potatoes carried by the grading belts or aprons 20 and 21 will drop therefrom and gravitate onto said conveyor chains 40 and 41 which will feed the caught potatoes in the direction of the knives or cutters 47 and 48 for the severing or cutting of the potatoes into pieces of the sizes as hereinbefore indicated.

Through the medium of the chains 49 and sprockets 50 power is transferred from the chain 40 to the power shafts 24 and 25 for the grading belts or aprons 20 and 21 to effect the driving of the same.

Leading from the trough 37 at its bottom and centralized relative thereto is a rearwardly inclined loading chute 51 having an endless conveyor 52 therein, the latter driven from a supplemental shaft 53 journaled in the legs 10 of the stand A. This shaft 53 through the chain 54 and sprockets 55 has connection with the driving shaft 43. The loading conveyor 52 carries flights 56 for the carrying of its load of cut potatoes for the discharge thereof from the chute 51 at its discharge or loading end.

Arranged in the throats 35 and 36 next to the cutters or knives 47 and 48 are pivotally supported spring tensioned forwardly convergent guides 57, these being in pairs in the throats and are located at opposite sides of the chains 40 and 41 so as to center the potatoes relatives to the cutters or knives 47 and 48 and to assure the advancement of said potatoes to the knives during the operation of the machine and in this fashion a uniform cutting of such potatoes will be had.

In the operation of the machine and from the foregoing it should be apparent that large and smaller potatoes, the latter known as medium sized potatoes, will be graded and the large potatoes severed into half pieces, while the medium or smaller potatoes will be severed into quarter pieces, whence the same will be discharged from the machine, the severing of the potatoes into pieces being uniformly carried forth during the working of the machine.

From the foregoing it is thought that the construction and manner of operation of the machine will be clearly understood and therefore a more extended explanation has been omitted.

What is claimed is:

In a machine of the kind described, a stand having a vertical chute intermediate of its length and open at its top and one side, inclined conveyors at one side of the chute and having their delivery ends next to the open top of said chute, one conveyor being elevated with relation to the other conveyor, lead throats horizontally disposed in said stand at the opposite side of said chute and communicative with the open side of the chute, a single horizontally disposed conveyor in one throat, a pair of upper and lower horizontally disposed conveyors in the other throat, and cutting knives in the respective throats at the outer discharge ends thereof and one being of the double cross blade type and the other a single blade type.

DANIEL NACHTIGAL.